United States Patent [19]

de Ronde

[11] 4,313,097

[45] Jan. 26, 1982

[54] IMAGE FREQUENCY REFLECTION MODE FILTER FOR USE IN A HIGH-FREQUENCY RECEIVER

[75] Inventor: François C. de Ronde, Lesigny, France

[73] Assignee: U.S. Philips Corporation, New York, N.Y.

[21] Appl. No.: 125,077

[22] Filed: Feb. 27, 1980

[30] Foreign Application Priority Data

Mar. 6, 1979 [FR] France ............................... 79 05735

[51] Int. Cl.[3] ...................... H01P 1/203; H01P 1/212; H04B 1/26

[52] U.S. Cl. .................................... 333/204; 333/246; 455/325

[58] Field of Search ............... 333/202, 204, 205, 246, 333/247, 238, 248; 455/313, 317, 318, 325, 327, 333

[56] References Cited

U.S. PATENT DOCUMENTS 3,678,433 7/1972 Hallford .......................... 333/204 X
3,688,225 8/1972 Cohn .................................. 333/204

OTHER PUBLICATIONS

Bates–"Design of Microstrip Spur-Line Band-Stop Filters", Microwaves, Optics and Acoustics, Nov. 1977, vol. 1, No. 6, pp. 209-214.

*Primary Examiner*—Marvin L. Nussbaum
*Attorney, Agent, or Firm*—Robert J. Kraus

[57] ABSTRACT

A planar image reflection mode filter is provided for reflecting parasitic signal frequencies produced in the mixer of a receiver. The filter includes a reflecting quarter-wavelength filter and an adaptive circuit functioning to enable the transmission of desirable frequencies. A slot can be formed in the quarter-wavelength filter to enable odd-mode resonance and reduce the width of a transition frequency band lying between a reflection band and a transmission band.

9 Claims, 13 Drawing Figures

FIG 1a
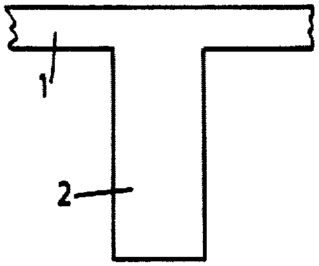
FIG. 1b
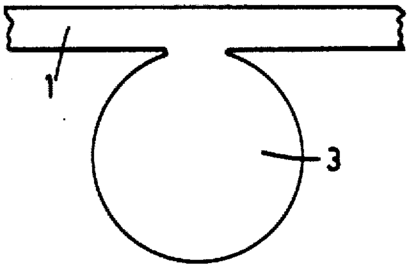
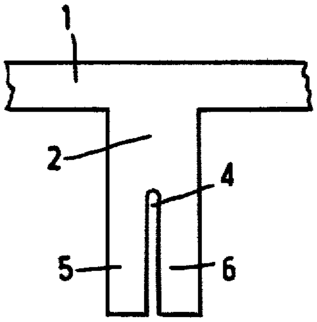
FIG. 2a
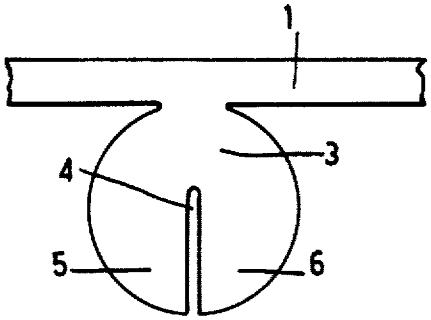
FIG. 2b
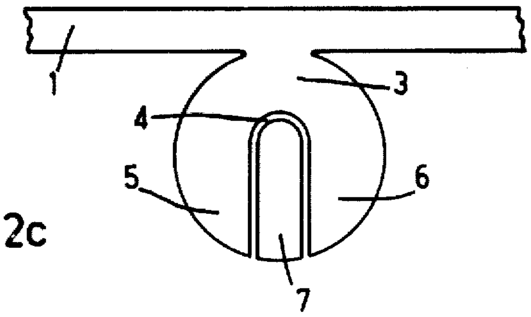
FIG. 2c

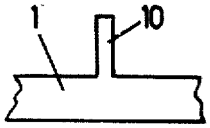
FIG.3a
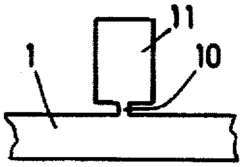
FIG.3b
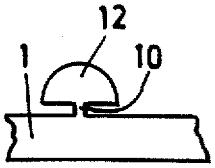
FIG.3c
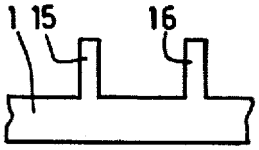
FIG 3d
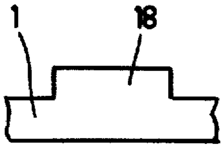
FIG 3e
FIG.6
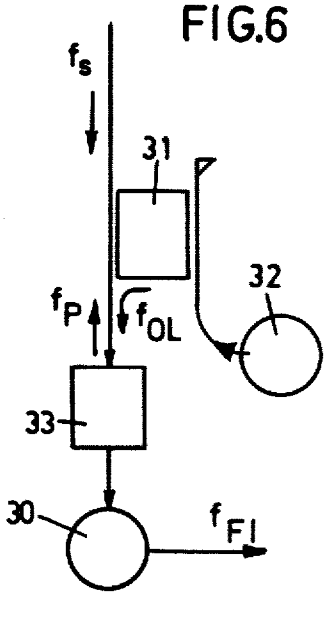
FIG.4
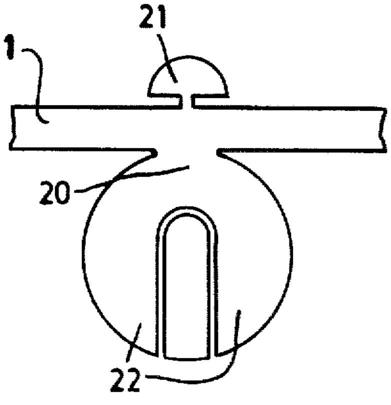
FIG.5
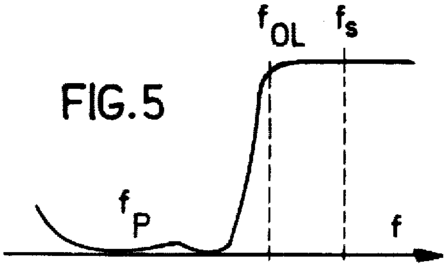

IMAGE FREQUENCY REFLECTION MODE FILTER FOR USE IN A HIGH-FREQUENCY RECEIVER

BACKGROUND OF THE INVENTION

The present invention relates to an image frequency reflection mode filter for distributed transmission lines implemented in planar form, for example in the form of a micro-strip. This filter is particularly suitable for use in a high-frequency receiver for television signals, this receiver comprising a mixer receiving on the one hand a receiving signal having the frequency $f_S$ and on the other hand a signal having the frequency $f_{OL}$ produced by a local oscillator. The mixer produces an intermediate frequency signal $f_{FI}$ which is equal to the difference between the frequencies $f_S$ and $f_{OL}$. The filter functions to prevent the transmission of a parasitic signal having the frequency $f_p$ (the image frequency) which is equal to ($2f_{OL}$-$f_S$), and which is sent from the mixer to the input of the high-frequency receiver.

Because the mixer is a non-linear device it can produce a whole series; of other second order products when the signals of frequencies $f_S$ and $f_{OL}$ are combined. These are also parasitic signals, but their frequencies are further removed than $f_p$ from the useful frequency band incorporating $f_S$ and $f_{OL}$. Filtration of these frequencies is not considered here.

A filter which must ensure a proper reflection of the signal of the parasitic frequency $f_p$, while still transmitting in an optimum manner the signals having the receiving frequency $f_S$ and, if possible, the signals having the frequency $f_{OL}$, must satisfy the following conditions:

the frequency band limited by the filter must be sufficiently wide to ensure that the reflection of the frequency $f_p$ will be considerable in the overall frequency band $f_p$ may occupy;

the losses must be as low as possible at the receiving frequency $f_S$ and, if possible also at the frequency $f_{OL}$, to enable the use of a local oscillator of the lowest possible power;

the reference level of the filter with respect to the mixer must be properly defined and localised, so that the action of the filter is independent of the frequency.

None of the known filters satisfies all these conditions. Neither conventional filters for coupling to transmission line nor the so-called spurline filters, which are compared with one another in the article "Design of Microstrip spur-line band-stop filters" published in the periodical Microwaves, Optics and Acoustics, November 1977, vol. 1, no. 6, operate satisfactorily enough to satisfy the above-mentioned requirements. The conventional filters reflect incident power poorly and are very sensitive to external influences (metallic objects). In these two respects the spur-line filters have improved performance, but their reference level with respect to the mixer is not properly defined. Additionally, the power losses at the frequency of the local oscillator are not inconsiderable, but are at least b 3 dB.

SUMMARY OF THE INVENTION

An object of the invention is to provide a novel filter of small size whose performance is considerably improved with respect to the prior art filters.

The invention relates to an image frequency reflecting mode filter for distributed transmission lines implemented in planar form, for example, in the form of a microstrip. The filter is particularly suitable for use in a high-frequency receiver comprising a mixer which receives on the one hand a receiving signal of frequency $f_S$ and on the other hand a signal of the frequency $f_{OL}$ produced by a local oscillator. The mixer produces an intermediate frequency signal $f_{FI}$, which is equal to the difference between the frequencies $f_S$ and $f_{OL}$. The filter functions to prevent the transmission of the parasitic signal having the frequency $f_p$ (i.e. the image frequency) which is equal to $2f_{OL}-f_S$ and is sent from the mixer to the input of the high-frequency receiver. The filter comprises an arrangement of distributed passive elements, which are placed substantially in the same points of the path of this parasitic signal and by means of which it is possible to obtain the desired filter curve. Each of these elements acts on a different part of the frequency band which comprises at least the frequencies $f_S$, $f_{OL}$ and $f_p$.

The components of this arrangement are selected judiciously, so that they function both individually and in combination to obtain the desired effects. Further, these components have been positioned so that their distance to the mixer renders it possible to obtain on the level of this mixer an optimum impedance for the frequency $f_p$, this impedance being considered as being optimum when the noise is at its lowest.

In its simplest embodiment the invention comprises the following components: a quarter-wave filter having a width which is at least equal to that of the transmission line and having a length equal to one quarter of the wavelength, in this transmission line, of the parasitic signal of frequency $f_p$; and an adaptive circuit which enables the reflection-free transmission of the signal having the frequency $f_S$. By means of this quarter-wavelength filter it is possible to obtain a very suitable reflection in a frequency band around $f_p$ and having a width determined by the choice of this quarter wavelength filter, whereas the adaptive circuit ensures optimum transmission of the signal of frequency $f_S$.

In a more elaborate embodiment, the image frequency reflection mode filter may comprise an additional component which is intended to enable odd-mode resonance in this quarter-wavelength filter. This component contributes towards a reduction of the width of a transition frequency band lying between the reflection band and the transmission band by lowering the upper limit of this transition frequency band, and contributes toward improving the adaptation of the filter to the receiving frequency $f_S$ and toward ensuring a proper adaptation to the local frequency $f_{OL}$. This improvement relating to $f_{OL}$ makes it possible to reduce the power of the local oscillator without an adverse effect on the quality of the high-frequency receiver in which it is included.

BRIEF DESCRIPTION OF THE DRAWING

Other details and advantages of the invention will be better understood from the following description and the accompanying exemplary drawing figures which show some embodiments of the invention:

FIGS. 1*a* and 1*b* show two examples of quarter wavelength filters;

FIGS. 2*a* to 2*c* show three examples of a quarter wavelength filter having an odd-mode resonator;

FIGS. 3*a* to 3*e* show five examples of an adaptive circuit;

FIG. 4 shows a preferred embodiment of the image frequency reflection mode filter according to the invention;

FIG. 5 shows a filter curve illustrating operation of filters constructed in accordance with the invention; and FIG. 6 shows how this filter according to the invention can be included in a high-frequency receiver.

DESCRIPTION OF THE PREFERRED EMBODIMENTS

The image frequency reflection mode filter according to the invention comprises an arrangement of distributed passive components which effect the desired filter characteristics by the action of each component on a respective different part of the frequency band containing the frequencies $f_S$, $f_{OL}$ and $f_p$. This arrangement comprises a quarter-wavelength filter such as those of FIGS. 1*a* and 1*b*, and an adaptive circuit such as those shown in FIGS. 3*a* to 3*e*. The quarter-wavelength filter may inter alia comprise an odd-mode resonator, which may be arranged as the resonators shown in FIGS. 2*a* to 2*c*.

The quarter wavelength filter of FIG. 1 consists of a rectangular stripline 2, perpendicular to a microstrip transmission line 1 to which it is connected. The width of the stripline 2 is, in the example described here, equal to double the width of the line 1, the width of the reflected frequency band increasing in proportion with th width of this strip. The length of the stripline 2 is equal to the quarter-wavelength associated with the frequency $f_p$. In the embodiment shown in FIG. 1*b* the quarter-wavelength filter consists of a circular flat conductor 3 which is connected to the microstrip line 1 which has a width equal to the width of the strip 2 of FIG. 1*a*. The diameter of this flat conductor 3 itself is equal to the quarter-wavelength associated with the frequency $f_p$ in the line 1.

FIGS. 2*a* and 2*b* show the quarter-wavelength filters of FIGS. 1*a* and 1*b*, respectively, but now provided with an odd-mode resonator in the shape of a slot which divides the strip 2 or the flat conductor 3 into two zones 5 and 6, which are excited by this odd mode. In FIG. 2*c* the much wider slot line 4 is occupied by an insulated conducting surface 7 intended to enable control of the resonant frequency and the over-voltage of the resonator in order to make the slope of the filter curve between $f_p$ and $f_{OL}$ steeper and, consequently, to reduce the width of the frequency band corresponding to this portion of the curve.

The adaptive circuit of FIG. 3*a* consists of a small rectangular strip conductor 10, which is perpendicular to the line 1. This strip 10 is comparable with a capacitive component which can correct for the inductive effects of a quarter-wavelength filter such as the filters shown in FIGS. 1*a* and 1*b*, with respect to the signal having the frequency $f_S$.

In the adaptive circuits shown in FIGS. 3*b* and 3*c* this strip 10 widens, immediately after the transition zone at the line 1, into a second strip conductor 11 or into a semi-circular flat conductor 12, respectively. The arrangement of the two elements in each of these adaptive circuits is intended to provide a series arrangement of an inductance and a capacitance.

In the embodiment of FIG. 3*d*, the adaptive circuit comprises two small rectangular strip conductors 15 and 16 which are perpendicular to the line 1 and arranged at a distance relative to one another which is one-eighth of the wavelength associated with the frequency $f_S$ to be transmitted. These two strips 15 and 16 are comparable with the parallel arrangement of two capacitors.

Finally, in the embodiment shown in FIG. 3*e*, the adaptive circuit comprises a rectangular flat conductor 18 having a length which is equal to three-eighths of the wavelength associated with the frequency $f_S$ to be transmitted and which is connected for its total length to the line 1. This flat conductor 18 joins two discontinuities and is comparable to a region having the lowest impedance for the frequency $f_S$.

FIG. 4 shows a preferred embodiment of the image frequency reflection mode filter according to the invention. This embodiment comprises an arrangement of the components shown in FIGS. 2*c* and 3*c*. These components include:

a quarter-wavelength filter 20 by means of which it is possible to obtain the desired attenuation in a frequency band around the parasitic frequency $f_p$ (see FIG. 5); and a series arrangement of an inductance and a capacitance 21 which is arranged in parallel with the line 1 and improves the transmission quality around the receiving frequency $f_S$ by means of a proper matching (see FIG. 5).

An odd-mode resonator 22 is included in the filter 20 to make the transition frequency band lying between the reflected band and the transmitted band narrower, and consequently to permit a proper matching for the frequency $f_{OL}$ (see FIG. 5).

The image frequency reflection mode filter shown in FIG. 4, which as shown in FIG. 5 functions as a bandstop filter, is particularly suitable for use in a high-frequency receiver for television signals such as that illustrated in FIG. 6. Signals having the frequency $f_S$ received by an aereal (not shown) are sent to a mixer 30, which also receives, via a directional filter 31, a signal having the frequency $f_{OL}$ produced by a local oscillator 32. This mixer supplies a signal having the intermediate frequency $f_{FI}$. The filter 33 is placed in the connection which precedes the input of the mixer 30 and at such a distance from the mixer that, for the image frequency $f_p$ to be reflected, the impedance seen by the mixer will be the optimum impedance.

It must be understood that the present invention is not limited to the above described and illustrated embodiments, but that on the basis of the disclosed information it is possible to develop other modes and other embodiments without going beyond the scope of the invention. For example the foregoing describes the use of the invention with a microstrip structure, but a filter according to the invention may also be used with a suspended microstrip structure.

What is claimed is:

1. A planar, image reflection mode filter for use with a receiver including an input for receiving a signal of frequency $f_S$, a local oscillator for supplying a signal of frequency $f_{OL}$, a mixer for receiving the signal of frequency $f_S$ and the signal of frequency $f_{OL}$, and a planar transmission line for coupling the signals to the mixer, the filter functioning to prevent transmission of a parasitic signal having the frequency $f_p = 2f_{OL} - f_S$ from the mixer to the input, said filter comprising:

A. a quarter-wavelength filter for connection at one end to the planar transmission line and having a width which is at least equal to that of the transmission line and a length which is equal to one quarter of the wave length of the signal of frequency $f_p$, the opposite end including a slot formed therein to enable odd-mode resonance in the quarter-wavelength filter; and B. an adaptive circuit for connection to the planar transmission line at substantially the same point of the parasitic signal path as the quarter-wavelength filter, said circuit functioning to enable transmission without reflection of the signal of frequency $f_S$.

2. A filter as in claim 1 where the quarter wavelength filter comprises a rectangular conductor adapted for perpendicular connection to the transmission line.

3. A filter as in claim 1 where the quarter wavelength filter comprises a circular conductor having a diameter equal to one quarter of the wavelength associated with the frequency $f_p$.

4. A filter as in claim 1 where the interior of the slot is occupied by a conducting surface which is insulated from the quarter-wavelength filter.

5. A filter as in claim 1, 2, 3 or 4, where the adaptive circuit comprises a rectangular conductor adapted for connection along its total length to the transmission line, said circuit having a length equal to three-eighths of the wave-length associated with the frequency $f_S$.

6. A filter as in claim 1, 2, 3 or 4, where the adaptive circuit comprises a rectangular conductor adapted for perpendicular connection to the transmission line, said circuit having a capacitance which corrects for the inductance of the quarter-wavelength filter at the frequency $f_S$.

7. A filter as in claim 1, 2, 3 or 4 where the adaptive circuit comprises a rectangular conductor adapted for perpendicular connection to the transmission line, said rectangular conductor widening into a second rectangular conductor to provide a series arrangement of an inductor and a capacitor.

8. A filter as in claim 1, 2, 3 or 4 where the adaptive circuit comprises a rectangular conductor adapted for prependicular connection to the transmission line, said rectangular conductor widening into a semi circular conductor to provide a series arrangement of an inductor and a capacitor.

9. A filter as in claim 1, 2, 3 or 4 where the adaptive circuit comprises two rectangular conductors for perpendicular connection to the transmission line at a distance from one another which is equal to one eighth of the wave length associated with the frequency of $f_S$.

* * * * *